L. Carpenter,

Fruit Basket.

No. 4,145. Reissued Oct. 4. 1870.

Witnesses:
Alex. F. Roberts
L. S. Mabee

Inventor:
L. Carpenter
Per Wm. C.
Attorneys.

United States Patent Office.

LAUREN CARPENTER, OF ST. JOSEPH, MICHIGAN.

Letters Patent No. 102,488, dated May 3, 1870; reissue No. 4,145, dated October 4, 1870.

IMPROVEMENT IN FRUIT-BASKETS.

The Schedule referred to in these Letters Patent and making part of the same.

*To all whom it may concern:*

Be it known that I, LAUREN CARPENTER, of St. Joseph, in the county of Berrien, and State of Michigan, have invented a new and useful Improvement in Fruit-Basket; and I do hereby declare that the following is a full, clear, and exact description thereof, which will enable others skilled in the art to make and use the same, reference being had to the accompanying drawing forming part of this specification.

This invention relates to a new and useful improvement in baskets for containing fruits, vegetables, or other articles, and It consists in an elevated platform-top, supported above the rim or top of such basket in any suitable manner, by means of which the contents of the basket may be protected, when the baskets are placed one upon another, as will be hereinafter more fully described.

In the accompanying drawing—

Similar letters of reference indicate corresponding parts.

Figure 1:
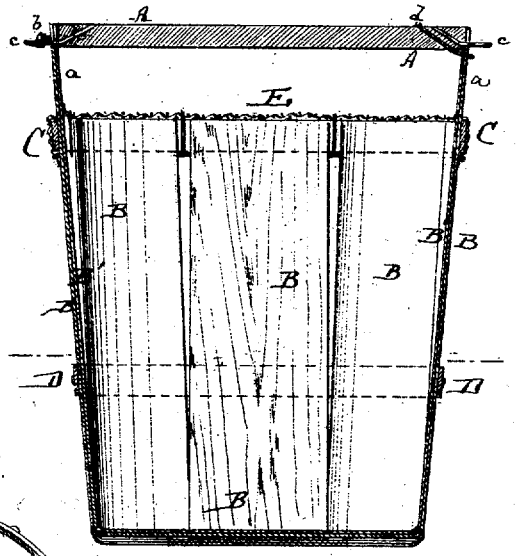
Figure 1 is a vertical central section of a fruit-basket, provided with my elevated top or protector.
Figure 2:
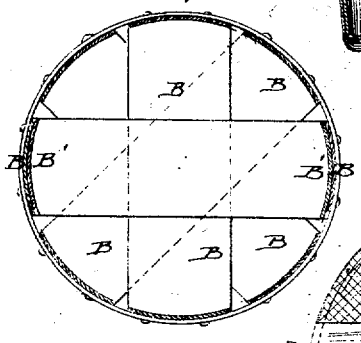
Figure 2 is a horizontal section of the same.
Figure 3:
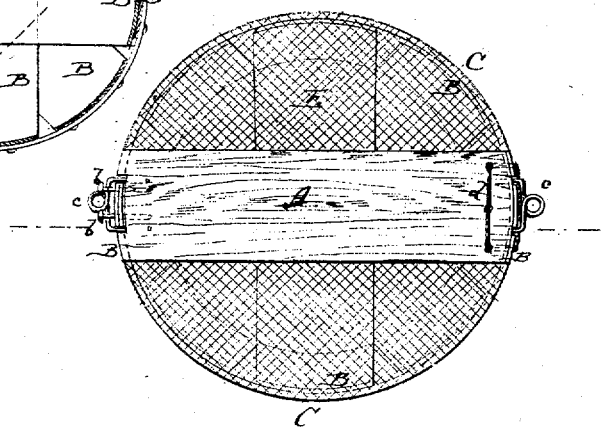
Figure 3 is a top view.

A represents the protector, elevated above the top of the basket, forming a platform consisting of one or more pieces of wood, metal, or other suitable material, of any desired width, and sufficiently elevated to allow the fruit or contents of the basket to be rounded off, if desired.

In this example of my invention, the protector A is supported on a basket by projecting arms *a*, and is fastened by the nails *b*, and loops C; but I do not confine myself to any particular mode of supporting the protector above the basket-top, or of fastening it in its position.

In the drawing—

B represents the splints of which the basket is composed.

C is an outer hoop, which surrounds the top of the basket, to which the splints B are secured.

D is a supporting-hoop, which may be used at or near the middle of the basket, if desired.

E represents the cloth cover, which may be sewed on, or fastened in the usual manner.

Having thus described my invention,

I claim as new and desire to secure by Letters Patent—

The elevated platform-top A, applied as and for the purpose described.

LAUREN CARPENTER.

Witnesses:
OGDEN SWEET,
OSCAR BROWN.